United States Patent [19]
Kurz

[11] Patent Number: 5,394,134
[45] Date of Patent: Feb. 28, 1995

[54] ELECTRIC SWITCHGEAR

[75] Inventor: Manfred Kurz, Ditzingen, Germany

[73] Assignee: Behr-Thomson-Dehnstoffregler GmbH Co., Germany

[21] Appl. No.: 156,921

[22] Filed: Nov. 8, 1993

[30] Foreign Application Priority Data

Nov. 6, 1992 [DE] Germany .............................. 4237546

[51] Int. Cl.⁶ .............................................. H01H 37/04
[52] U.S. Cl. .................................... 337/398; 337/327; 337/380
[58] Field of Search ................ 337/398, 399, 380, 298, 337/299, 327

[56] References Cited

U.S. PATENT DOCUMENTS

| 4,091,354 | 5/1978 | Deubel et al. | 337/380 |
| 4,225,841 | 9/1980 | Saur et al. | 337/393 |
| 4,318,073 | 3/1982 | Rossler, Jr. et al. | |
| 4,580,123 | 4/1986 | Roller et al. | 337/103 |

FOREIGN PATENT DOCUMENTS

| 1591394 | 2/1971 | Germany . |
| 6610339 | 9/1973 | Germany . |
| 2749848 | 6/1978 | Germany . |
| 7919535 | 8/1979 | Germany . |
| 3703465 | 8/1988 | Germany . |
| 1524014 | 9/1978 | United Kingdom . |

Primary Examiner—Lincoln Donovan
Attorney, Agent, or Firm—Evenson, McKeown, Edwards & Lenahan

[57] ABSTRACT

An electric switchgear having at least one switching element that is a semiconductor with a temperature-dependent resistance, which includes a housing joined together from a metal cap and a closing element made of plastic. Contact tabs of the switching element are inserted into recesses of the closing element, and the metal cap and the closing element are connected with one another by a joining element made of plastic which is cast on on the outside and which surrounds the edge of the metal cap and surrounds the closing element at least partially.

20 Claims, 1 Drawing Sheet

ELECTRIC SWITCHGEAR

BACKGROUND AND SUMMARY OF THE INVENTION

This invention relates to an electric switchgear comprising at least one switching element which is a semiconductor with a temperature-dependent resistance and which is arranged in a liquid-tight housing, from which contact tabs project of the switching element.

In order to produce a switching element of the initially mentioned type, it is known from German Patent Document DE 37 03 465 A1 to provide a mounting body which holds electric contacts with a semiconductor arranged in-between and around which, together with the contacts and the semiconductor, plastic material is cast. The plastic material will then form the housing including a plug receiving device.

It is also known, from German Patent Document DE-G 6 610 339.7, to coat a semiconductor provided with electrodes with a thin heat-resistant plastic layer to which a metal coating is applied by currentless metal deposition and subsequent electrodeposition. The semiconductor with the electrodes is held by connecting wires in a ceramic insulating body which is partially covered by the plastic layer and also by the metal coating.

An object of the invention is to provide a switchgear of the initially mentioned type which is simple and inexpensive to manufacture and permits a good heat transfer to the semiconductor or semiconductors.

This and other objects are achieved in that the housing is joined together from a metal cap and a closing element made of plastic, in that the contact tabs are fitted into recesses of the closing element, and in that the metal cap and the closing element are connected with one another by a joining element made of plastic which is cast on the outside and which encloses the edge of the metal cap and encloses the closing element at least partially.

In the switchgear of the present invention, the metal cap and the closing element made of plastic, together with the semiconductor or semiconductors and the contact tabs, form a constructional unit which can be preassembled and which is then completed to form the finished switchgear by the molding-on of the joining element. The joining element holds the individual elements of the subassembly securely together and provides a liquid-tight connection. The metal cap, in whose area the semiconductor or semiconductors is/are situated, permits a good heat transfer so that a fast response to the respective temperatures is ensured.

In certain embodiments of the invention, the contact tabs are fixed in the joining element. The contact tabs, which at first are fitted into the closing element only relatively loosely, are securely held by the cast-on joining element so that, in particular, connections are possible that can be plugged in.

In certain embodiments of the invention, the joining element surrounds the areas of the contact tabs by a surrounding web which is constructed as a plug housing. In these embodiments, a plug housing is therefore created at the same time by the molding-on of the joining element.

In certain embodiments of the invention, the joining element has a ring collar serving as a holding device for the switchgear.

In certain embodiments of the invention, the interior space between the metal cap and the closing element is filled with a medium at least in the area receiving the switching element or elements, this medium having a higher thermal conductivity than air. Thus, the rate of response of the switchgear is improved further. Advantageously, it is provided in these embodiments that the interior space is filled at least partially with a hardening resin. This ensures that the switching elements are securely fixed in the interior space so that the switchgear will not be damaged even in the case of shocks and vibrations.

Other objects, advantages and novel features of the present invention will become apparent from the following detailed description of the invention when considered in conjunction with the accompanying drawings.

DETAILED DESCRIPTION OF THE DRAWINGS

Figure 1:
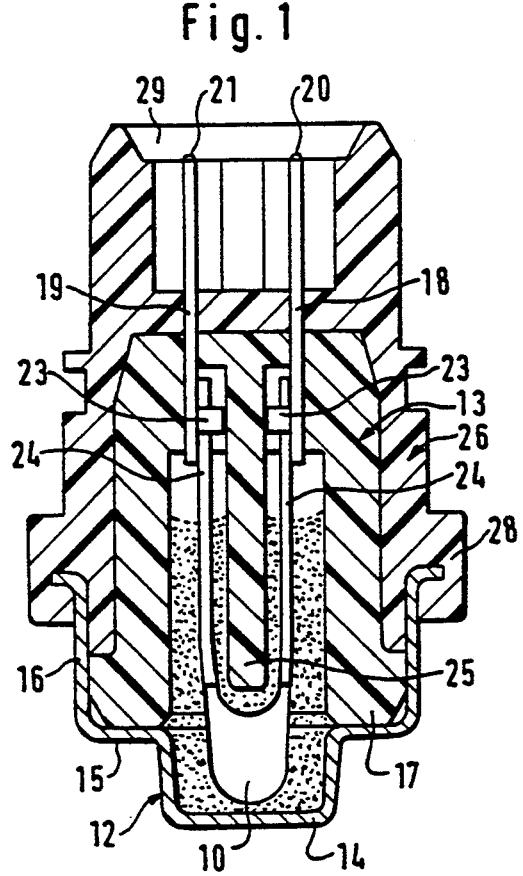
FIG. 1 is an axial sectional view along Line I—I of FIG. 3 of a switchgear according to an embodiment of the present invention.

The illustrated electric switchgear is used particularly as a temperature sensor for detecting the coolant temperature of a motor vehicle engine. As the switching elements, it contains two semiconductors 10, 11 which have an electric resistance which changes as a function of the temperature. By means of a suitable material composition, the semiconductor elements 10, 11 may be constructed such that they have a high electric resistance up to a certain temperature which prevents virtually any current flow and, when this temperature is reached, alter their resistance such that a current will flow in the case of the voltages available in a motor vehicle. These will then be semiconductor elements 10, 11 with negative temperature coefficients (NTC). Likewise, it is possible, however, to use semiconductor elements 10, 11 with a positive temperature coefficient which, when a certain temperature is reached, increase their electric resistance such that then virtually no more current will flow in the case of the applied voltages. In certain embodiments, the switchgear is designed such that, when the operating temperature of the coolant is reached, one of the switching elements triggers a switching, while the other triggers a switching in the case of a significant exceeding of the operating temperature.

The switching elements 10, 11 are arranged in a liquid-tight housing which includes a metal cap 12 and a closing element 13 made of plastic. The metal cap 12 has a cup-type recess 14 in whose area the switching elements 10, 11 are arranged. This cup-type recess 14 is followed by a ring shoulder 15 which is surrounded by an essentially cylindrical edge 16.

Figure 2:
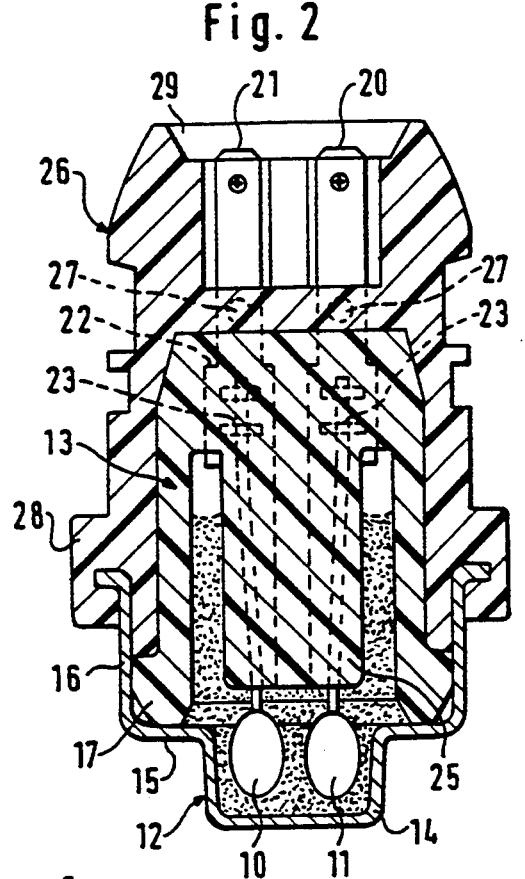
FIG. 2 is an axial sectional view along Line II—II of FIG. 3 which is rotated by 90° with respect to FIG. 1.
Figure 3:
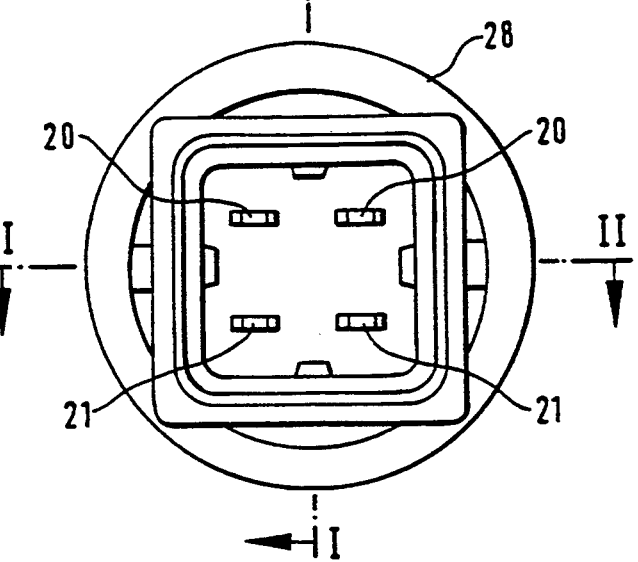
FIG. 3 is a top view of the switchgear of FIGS. 1 and 2.

The closing element 13, which is manufactured as a plastic preform, has a flange 17 by means of which it is supported on the ring shoulder 15 of the metal cap 12. As illustrated in FIG. 1 and 2, the edge 16 of the metal cap 12 projects in the axial direction of the switchgear beyond the flange 17.

The closing element 13 has an essentially cylindrical shape and is closed in the area of its top end. The closed area of the closing element 13 is provided with recesses 18, 19 into which contact tabs 20, 21 are inserted from the interior side. The contact tabs 20, 21 are provided with widened steps 22 which are supported during the insertion on corresponding steps of recesses 18, 19 and thus form a defined mounting position. The contact tabs 20, 21 are provided with punched-out and pressed-out lugs 23 into which connecting wires 24 are inserted and soldered which connect the contact tabs 20, 21 with the switching elements 10, 11. From the closed end of the closing element 13, a separating web 25 projects toward the inside and is in each case situated between two connecting wires 24 leading to a switching element 10, 11.

During the mounting, the connecting wires 24 of the switching elements 10, 11 are first connected with the contact tabs 20, 21. They are fitted into the holes formed by the lugs 20 23 and are soldered to them. Then the contact tabs 20, 21 are inserted from the inside into the closing element 13 until they rest with their steps 22 against corresponding steps of the recesses 18, 19.

Before the further assembly, the closing element 13, which is preassembled with the switching elements 10, 11 and the contact tabs 20, 21, is brought into a position which is rotated by 180° with respect to the drawing according to FIG. 1 and 2 so that the switching elements 10, 11 project upward and the closing element is 13 open toward the top. In this position, a thermal conduction medium is filled into the interior of the closing element 13. This thermal conduction medium consists of a hardening resin into which the metal powder is mixed. Subsequently, the metal cap 12 is mounted on the closing element 13. Before the resin can harden, this preassembled constructional unit is rotated again by 180°; that is, into the position illustrated in FIG. 1 and 2. In this position, the thermal conduction medium flows downward into the area of the cup-type recess 14 and surrounds the switching elements 10 and 11.

The preassembled constructional unit comprising the abovementioned elements will then be placed in a mold in which a joining element 26 is sprayed around it. If the thermal conduction medium has already hardened, the position which the preassembled construction unit takes up while the spraying takes place around it is not important. However, if the hardening thermal conduction medium is adjusted such that it will not harden before the spraying around it takes place, the preassembled constructional unit will expediently be placed in the injection mold in such a manner that the metal cap 12 is situated on the bottom; that is, in the position illustrated in FIGS. 1 and 2.

The joining element 26, which consists of the same plastic material as the closing element 13 or of a plastic material that bonds with the closing element, establishes a firm connection between the metal cap 12 and the closing elements 13. The joining element 26 surrounds the closing element 13 to the extent that its exterior side is exposed. In addition, it surrounds the edge 16 of the metal cap 12. The edge 16 is bent toward the outside so that a form-locking connection is established between the metal cap 12 and the joining element 26.

The joining element 26 receives such a shape that it fulfills further functions. First, it has the purpose of securely fastening the contact tabs 20, 21. For this purpose, the contact tabs 20, 21 are provided with recesses 27 which are situated outside the closing element 13 and into which the material of the joining element 26 will penetrate and will thus fix the contact tabs not only by force-locking but also by form-locking. In addition, in the area in which it receives the edge 16 of the metal cap 12, the joining element 26 also forms a surrounding ring collar 28 which is used as a fastening device by means of which the switchgear is fastened on an engine block or the like. Furthermore, the joining element 26 forms a plug housing 29 which surrounds the areas of the contact tabs 20, 21 which project to the outside. The plug housing 29 essentially comprises a surrounding web which encloses approximately a square and which is provided with the projections required for the plug housing 29.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An electric switchgear comprising:
   at least one switching element which is a semiconductor with a temperature-dependent resistance and which has contact tabs; and
   a liquid-tight housing, the switching element being arranged in the housing such that the contact tabs project out of the housing, the housing including: a metal cap and a plastic closing element that are joined together, the metal cap having inner and outer surfaces, the closing element having recesses, the contact tabs being inserted into the recesses of the closing element; and a plastic joining element cast on the outside of the metal cap and the closing element, the plastic joining element connecting the metal cap and the closing element with one another and completely surrounding the edge of the metal cap such that the plastic joining element extends over the inner and outer surfaces of the metal cap and at least partially surrounding the closing element.

2. A switchgear according to claim 1, wherein the contact tabs are fixed in the joining element.

3. A switchgear according to claim 2, wherein the joining element includes a surrounding web which is a plug housing that surrounds the area of the contact tabs.

4. A switchgear according to claim 3, wherein the joining element has a ring collar serving as a holding element for the switchgear.

5. A switchgear according to claim 4, further comprising a medium which has a higher thermal conductivity than air in an interior space between the metal cap and the closing element, the medium filling the interior space at least in the area receiving the switching element or elements.

6. A switchgear according to claim 5, wherein the medium includes a hardening resin.

7. A switchgear according to claim 6, wherein the resin includes embedded metal elements in powder form.

8. A switchgear according to claim 7, wherein the metal cap includes a ring shoulder, and the closing element is supported on the ring shoulder.

9. A switchgear according to claim 8, wherein the closing element has a flange supported on the ring shoulder, the edge of the metal cap projecting beyond the flange and bordered by the joining element.

10. A switchgear according to claim 9, further comprising a form-locking connection between the edge of the metal cap and the joining element.

11. A switchgear according to claim 12, wherein the edge of the metal cap is bent.

12. A switchgear according to claim 1, wherein the joining element includes a surrounding web which is a plug housing that surrounds the area of the contact tabs.

13. A switchgear according to claim 1, wherein the joining element has a ring collar serving as a holding element for the switchgear.

14. A switchgear according to claim 1, further comprising a medium which has a higher thermal conductivity than air in an interior space between the metal cap and the closing element, the medium filling the interior space at least in the area receiving the switching element or elements.

15. A switchgear according to claim 14, wherein the medium includes a hardening resin.

16. A switchgear according to claim 15, wherein the resin includes embedded metal elements in powder form.

17. A switchgear according to claim 1, wherein the metal cap includes a ring shoulder, and the closing element is supported on the ring shoulder.

18. A switchgear according to claim 17, wherein the closing element has a flange supported on the ring shoulder, the edge of the metal cap projecting beyond the flange and bordered by the joining element.

19. A switchgear according to claim 1, further comprising a form-locking connection between the edge of the metal cap and the joining element.

20. A switchgear according to claim 19, wherein the edge of the metal cap is bent.

* * * * *